United States Patent [19]
Renfroe et al.

[11] Patent Number: 5,763,817
[45] Date of Patent: Jun. 9, 1998

[54] CENTER GAS FILL INFLATOR

[75] Inventors: Donald W. Renfroe; Michael G. Womack; Venny H. Sneed, all of Knoxville; David A. Bilbrey, Crossville, all of Tenn.

[73] Assignee: Bendix-Atlantic Inflator Company, Knoxville, Tenn.

[21] Appl. No.: 702,399

[22] Filed: Aug. 14, 1996

[51] Int. Cl.⁶ .................. F42B 3/00; C06D 5/06; B60R 21/28
[52] U.S. Cl. .................. 102/326; 102/288; 102/289; 280/736; 280/742
[58] Field of Search .................. 102/326, 288, 102/289; 280/736, 742

[56] References Cited

U.S. PATENT DOCUMENTS

| | | | |
|---|---|---|---|
| 5,022,674 | 6/1991 | Frantom et al. | 280/741 |
| 5,199,740 | 4/1993 | Frantom et al. | 280/736 |
| 5,257,819 | 11/1993 | Frantom et al. | 280/737 |
| 5,345,876 | 9/1994 | Rose et al. | 102/531 |
| 5,351,988 | 10/1994 | Bishop et al. | 280/737 |
| 5,441,332 | 8/1995 | Johnson et al. | 280/736 |
| 5,566,853 | 10/1996 | Schenker et al. | 280/741 |
| 5,582,428 | 12/1996 | Buchanon et al. | 280/741 |

*Primary Examiner*—Peter A. Nelson
*Attorney, Agent, or Firm*—Markell Seitzman; Frank P. Presta

[57] ABSTRACT

An inflator and method of constructing the inflator comprising: a pressure vessel (22) in which inflation gas is stored; the pressure vessel including a first opening (114), pyrotechnic generator (42, 130) situated remote from the pressure vessel for generating products of to heat the inflation gas, a first burst disk (160, 150, 150') mounted to the pressure vessel to seal the first opening thereof after the pressure vessel has been charged to a determinable pressure with inflation gas and in communication with the pyrotechnic generator such that the products of combustion assist in the opening of the first burst disk.

14 Claims, 3 Drawing Sheets

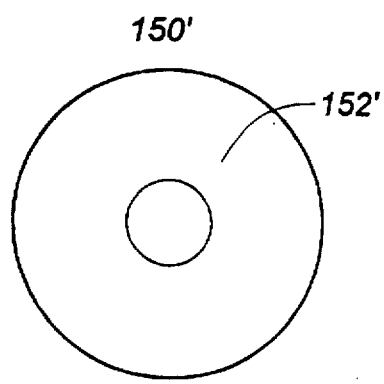
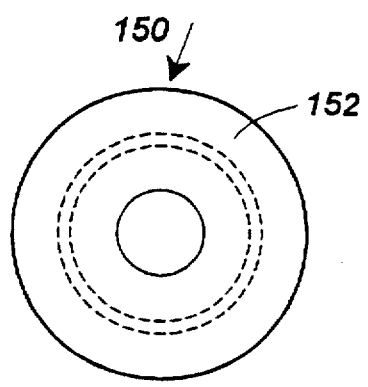
FIG. - 6     FIG. - 4
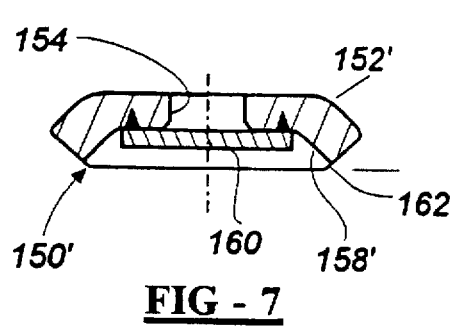
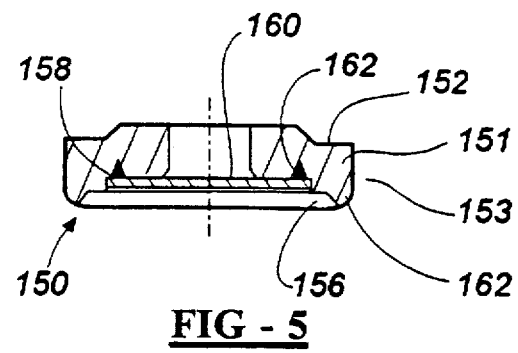
FIG - 7     FIG - 5

CENTER GAS FILL INFLATOR

BACKGROUND AND SUMMARY OF THE INVENTION

The present invention generally relates to hybrid inflators, and also to a method of filling the inflator through a center-fill port.

Reference is made to FIG. 1 which illustrates a prior art hybrid inflator. This hybrid inflator includes a pressure vessel 20, formed by a thin-walled tube 22, an end cap 24 and a generant (pyrotechnic or energetic) housing 30. The end cap 24 is sealed (welded) to the tube 22 and has a fill port 26 sealed by a welded steel ball 28. The generant housing closes the other end of the tube 22 and includes a narrowed portion (having a neck or shoulder) 32 that supports a thin burst disk 34. The generant housing 30 also includes a plurality of gas exit flow ports 36 about its periphery. The burst disk 34 is laser welded to the generant housing 30 prior to attaching the housing to the tube 22. The tube may be cold drawn in which case the cap 24 is integrally formed therewith or, alternatively, the cap 24 is welded thereon as a separate part. Inflation gas is received through the fill port 26 which is later sealed. A pyrotechnic or energetics package, generally designated as 42, having an electrically ignited initiator to provide for an intense flame which ignites a closely spaced, larger quantity of propellant is located in the generant housing 30. The generant housing 30 may additionally support a closure member, as is known in the art, such as another end cap 40 that may be attached thereto to provide an enclosure about the pyrotechnic package 42. In operation the ignitor and/or propellant produce an intense flame or pressure wave which is directed through the housing 30 at the burst disk 34. The products of combustion produced by the burning of the initiator and/or propellant open the burst disk 34 whereafter the stored inflation gas flows through the interior opening 44 in the housing 30, is heated by the continued burning of the propellant and exits the exit ports 36 to inflate a closely positioned air bag.

FIG. 2 is also illustrative of a different type of prior art hybrid inflator. This inflator may include a similarly constructed generant housing 30 having a quantity of propellant 42 and a burst disk 34. The opposite end of the tube 22 supports a second burst disk 60 attached to the tube 22 or end cap/manifold 62. The manifold 62 is attached to the end 22a of the tube 22. Upon activation of the pyrotechnics 42, the first burst disk 34 is opened, the stored inflation gas within the pressure vessel 20 is heated to a pressure sufficient to rupture the second burst disk, whereupon heated inflation gas flows through the openings 36 in the manifold 62. As can be seen the ends of this type of pressure vessel 20' support the various burst disks 34 and 60, consequently, the fill port 26 must be moved to a different location. In this type of inflator the fill port 26 is moved to the side of the tube and is also sealed by a welded ball 28. The deficiencies of this type of inflator are that safety regulations for stored gas containers require that fill ports and attachment couplings be placed on the head of the container. Further, an inflator with fill ports in the side wall may create stress risers which may reduce the structural integrity of the pressure vessel. Additionally, placing a fill port on a side of the pressure vessel would make it more difficult to align, seal, fill and weld the fill port 26 closed due to the radius of curvature of the cylindrical pressure vessel.

Accordingly, the invention comprises: an inflator and method of constructing the inflator comprising: a pressure vessel in which inflation gas is stored; the pressure vessel including a first opening, pyrotechnic generator situated remote from the pressure vessel for generating products of to heat the inflation gas, a first burst disk mounted to the pressure vessel to seal the first opening thereof after the pressure vessel has been charged to a determinable pressure with inflation gas and in communication with the pyrotechnic generator such that the products of combustion assist in the opening of the first burst disk.

Many other objects and purposes of the invention will be clear from the following detailed description of the drawings.

BRIEF DESCRIPTION OF THE DRAWINGS

In the drawings:

FIGS. 4 and 5 show various views of a seal disk or bulkhead.

FIGS. 6 and 7 show various views of alternate seal disk.

DETAILED DESCRIPTION OF THE DRAWINGS

Figure 3:
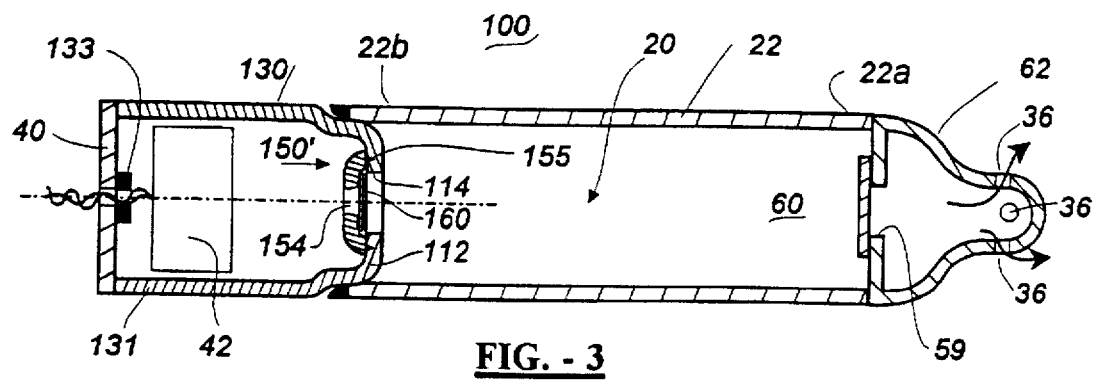
FIG. 3 shows a hybrid inflator constructed in accordance with the present invention.

Reference is now made to FIG. 3 which illustrates an inflator 100 having a thin wall, typically steel tube 22 having open ends 22a and 22b. A manifold 62 or end cap 24 is secured, such as by welding, to the open end 22a. The manifold includes an opening 59 therein which is part of the pressure vessel 22. The opening 59 is closed by a thin burst disk 60 made from stainless steel, Inconel or other suitable material. The manifold 62 includes a plurality of exit ports 36. The other end 22b of the tube 22 is attached, such as by welding, to a generant or pyrotechnic housing 130 having a narrowed end portion 112 with another opening 114 therein. As can be appreciated the end portion 112 and opening 114 form part of the pressure vessel 22. The present invention is distinguished from the prior art in that while this inflator 100 uses a pyrotechnic housing 130 and one or more burst disks, the pressure vessel 20 is centrally filled through the pyrotechnic housing, using a seal or bulkhead 150 (or 150') to seal the pressure vessel 22 and to control the flow of the products of combustion from the generant housing into the pressure vessel 22. As will be seen from the description below this bulkhead is attached to the pressure vessel after the pressure vessel is charged with inflation gas. The advantages of this type of construction are: the flow control orifice 154 for the pyrotechnic is more easily fabricated and inspected as a separate item outside the confines of the pyrotechnic housing 30. The center fill of the pressure vessel also provides for less complex tooling than would otherwise be required to fill an inflator having a side fill port or an end fill port orientated off-center to the center line of the inflator.

Reference is briefly made to FIGS. 4 and 5 which illustrate a first embodiment of a seal or bulkhead 150 and FIGS. 6 and 7 which illustrate a second embodiment of another seal or bulkhead 150'. The bulkhead 150 includes a circular body 152 having a base 151 with side wall 153. A thin annular ridge 162 extends downwardly from the base or side walls to provides a projection contact against end 112 of the generant housing 130 to enable a quality resistance weld 155 therebetween. The circular body 152 of the bulkhead 150 has the central opening (control orifice) 154 which is part of a stepped bore 156 which as can be seen defines a recess. The stepped bore also includes an annular shoulder 158. A thin burst disk 160 of the same material as disk 60 is peripherally laser welded (see weld 162) to the shoulder 158.

An alternate bulkhead 150' (see FIGS. 6 and 7) is fabricated from a bent-over washer having a body 152', opening 154 and an annular shoulder 158'. The burst disk 160 is also peripherally welded to the shoulder 158 closing opening 154. As illustrated the bent-over disk includes a circular point contact edge 162', formed by a corner of the bent-over side wall of body 152', which similarly defines a projection to permit a quality resistance weld to the housing 130. As can be appreciated the size of the opening (control orifice) 154 controls the rate of pressure build-up within the chamber 130 (see FIG. 3) and hence the rate at which products of combustion are communicated to the pressure vessel 20.

Figure 1:
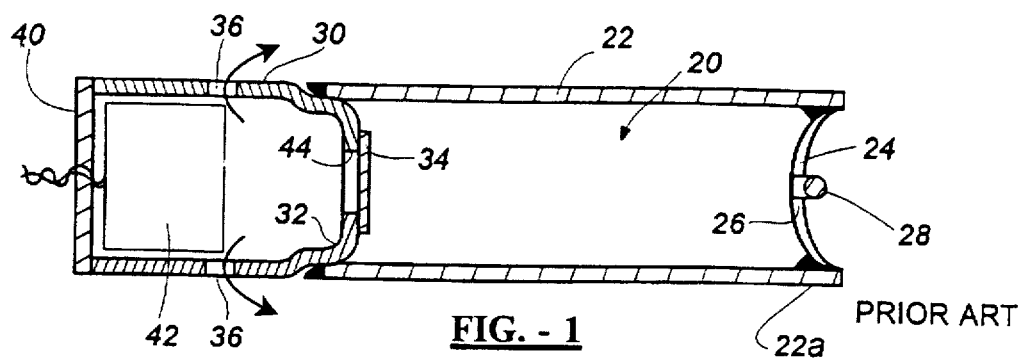
FIGS. 1 and 2 are illustrative of prior art inflators.
Figure 2:
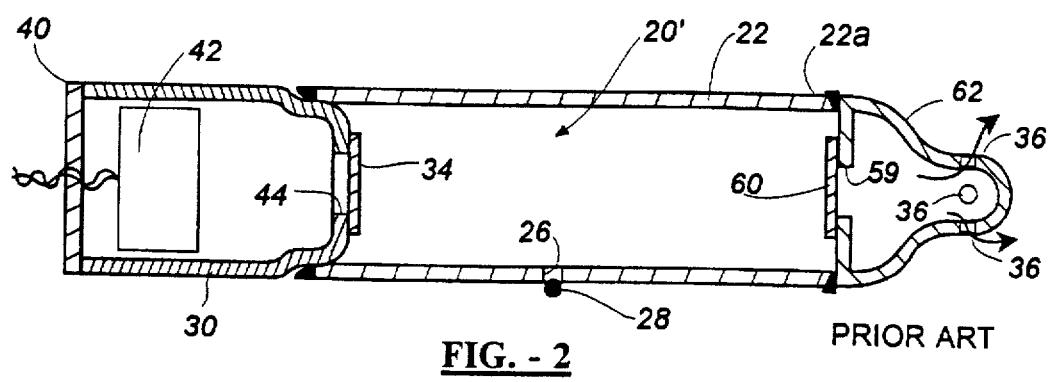
Figure 8:
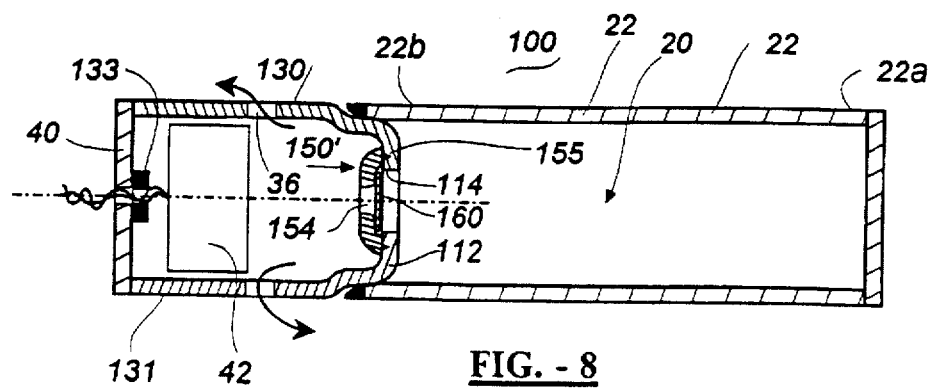
FIG. 8 illustrates another embodiment of the invention.

Reference is briefly made to FIG. 8 which illustrates another variant of the present invention using a construction similar to that of FIG. 1. In this embodiment the end 22a of the pressure vessel is closed by an end cap 24 which is devoid of fill port 26. Walls 131 of the generant housing 130 include a plurality of exit ports 36. The opening 114 of the housing 130 is closed by a bulkhead 150 or 150'.

Figure 9:
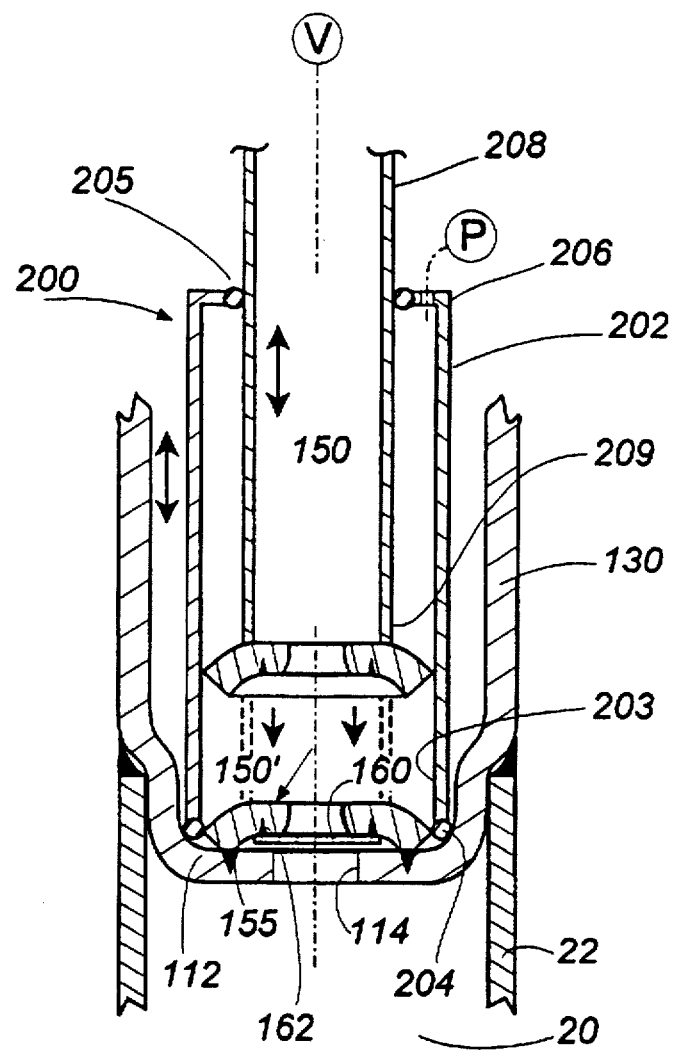
FIG. 9 diagrammatically shows an inflator being filled.

Reference is made to FIG. 9 which is an enlarged partial cross-sectional view of the inflator shown in FIGS. 3 and 8 showing the housing 130 and part of the tube 22 forming the pressure vessel and is illustrative of a method of filling and sealing the pressure vessel 20 using either bulkhead 150 or 150'. This method utilizes a fill and weld machine 200 of generally known construction and which is diagrammatically illustrated. This (and similar machines) 200 includes a first hollow tube or sleeve 202 having an O-ring seal 204 at one end 203. The other end 206 of the sleeve 202 includes an annular seal 205 and is also connected to a source P of pressurized inflation gas (argon or argon plus helium). The seal 205 provides a fluid tight seal against a movable, sliding second hollow sleeve or tube 208. The second hollow tube 208 is connected to a vacuum source generally shown as V. This second tube 208 is typically constructed of copper and also functions as a welding electrode. With the first sleeve or tube 202 raised, the bulkhead 150 or 150' is brought into contact with the end 209 of the tube (electrode) 208 or visa versa and with vacuum applied the bulkhead 150 is held to the electrode (tube) 208. As an example, if the first and second tubes can't be moved laterally so as to move to pick up a bulkhead located to the side of the inflator 100, the bulkhead can be placed on the center of a movable arm (not shown) which is them moved under the second tube 208. Thereafter the second tube is lowered to pick up (using vacuum) the bulkhead from its movable arm. With the bulkhead now attached to the tube 208, the outer or first tube 202 is lowered and brought into contact with the end 112 of the generant housing 130. The second sleeve 208 with the bulkhead 150 attached thereto remains spaced from the end 112 as generally as shown in FIG. 9. Pressurized inflation gas from source P is communicated through the tube 202 and flows through the opening 114 in the generant housing 130 filling the pressure vessel to a pressurized level. During this operation, the interior of sleeve 202 is pressurized to the same designated pressure level. The electrode (sleeve) 204 is then lowered placing the bulkhead 150 or 150' against the end 112 of the generant housing. Thereafter an electric current is caused to flow through the electrode welding the bulkhead 150 to the end 112. With the bulkhead sealed in place the burst disk 160 is mounted proximate an exterior wall surface of the pressure vessel.

Reference is again made to FIGS. 3 and 8 which diagrammatically illustrates a pyrotechnic or energetics package 42 located within the housing 130. As can be appreciated this energetics package 42 is inserted into the housing after the pressure vessel 22 is sealed. The pyrotechnic or energetics package 42 is connected by wires, in a known manner, to an electric control circuit (ECU). The end of the housing 130 is then sealed by a closure such as plate 40 (welded or threaded thereon) to prevent inflation gas from escaping out of the generant housing 130 after the burst disk 160 has been ruptured. The wires can be passed through an opening in the housing 130 or plate 40 and a glass-to-metal seal 133 may be used if needed. With regard to the inflator of FIG. 3, upon activation of the pyrotechnic (or energetics) package 42, products of combustion are produced raising the pressure within the generant housing 130. When this pressure reaches a level in excess of the pressure within the pressure vessel and the structural integrity of the burst disk 160, the burst disk 160 is ruptured permitting the products of combustion to enter into the pressure vessel 22 heating the inflation gas to increase the pressure thereby opening the second burst disk 60. Thereafter the inflation gas exits the openings within the manifold 62. With regard to the inflator of FIG. 8, the products of combustion produced by the combustible material within the energetics package 42 open the burst disk 160 permitting inflation gas to flow out of the pressure vessel through the control orifice 154 and be heated by the products of combustion prior to existing the exit ports 36 in the side 131 of the generant housing 130.

Many changes and modifications in the above described embodiment of the invention can, of course, be carried out without departing from the scope thereof. Accordingly, that scope is intended to be limited only by the scope of the appended claims.

We claim:

1. An inflator comprising:
a pressure vessel (22) in which inflation gas is stored; the pressure vessel including a first opening (114), pyrotechnic means (42, 130) situated remote from the pressure vessel for generating products of to heat the inflation gas, a first burst disk means (160, 150, 150') mounted to the pressure vessel to seal the first opening thereof after the pressure vessel has been charged to a determinable pressure with inflation gas and in communication with the pyrotechnic means such that the products of combustion assist in the opening of the first burst disk means.

2. The inflator defined in claim 1 wherein the first burst disk means (160) includes: a bulkhead (150, 150') having a body (152) including a base portion (151) with a control orifice (154) therein, for controlling the rate of pressure increase on a facing side of the burst disk and for controlling the rate at which pyrotechnic material of the pyrotechnic means burns, and a wall portion (152) in contact with the exterior of the pressure vessel proximate the first opening (114) and wherein a first burst disk (160) is sealingly mounted to the bulkhead (150, 150') for enclosing the control orifice.

3. The inflator as defined in claim 2 wherein the first burst disk is located between the bulkhead and an exterior wall of the pressure vessel.

4. The inflator as defined in claim 2 wherein the bulkhead is formed from a washer (150') having coined or bent walls, and wherein a central hole of the washer defines the control orifice (154).

5. The inflator as defined in claim 4 wherein the first burst disk is located between the bulkhead and an exterior wall of the pressure vessel.

6. The inflator as defined in claim 2 wherein the bulkhead includes a body having the control orifice therein and a recess upon which the first burst disk (160) is sealingly secured.

7. The inflator as defined in claim 1 wherein pressure vessel includes a tubular section (22) having an open end (22b) and a pyrotechnic housing (130) an end portion is mounted to the open end of the tubular section, the pyrotechnic housing including an end or walled portion (112) secured to the tubular section forming a wall of the pressure vessel and wherein the first opening (114) of the pressure vessel is defined by an opening with the end or walled portion of the pyrotechnic housing.

8. The inflator as defined in claim 7 wherein the bulkhead is attached to the end (112) of the pyrotechnic means on a side thereof opposite the tube (22) and wherein the bulkhead covers the opening (114) in the end.

9. The inflator as defined in claim 1 includes a second opening (59) closed by a second burst disk (60) which is opened after the pressure within the pressure vessel is increased to a determinable level to permit inflation gas stored within the pressure vessel to escape therefrom through at least one exit port (36).

10. The inflator as defined in claim 9 wherein the exit port is located downstream of the second burst disk.

11. The inflator as defined in claim 7 wherein an exit port is located with the pyrotechnic housing (130).

12. The inflator as defined in claim 7 wherein the first burst disk is located between the pressure vessel and the body of the bulkhead.

13. An inflator comprising:
a pressure vessel (22) in which inflation gas is stored; the pressure vessel including a first opening or fill port (114) through which inflation gas is placed into the pressure vessel, pyrotechnic means (42, 130) for generating products of combustion to heat the inflation gas, a first burst disk means (160, 150, 150') mounted to the pressure vessel to seal the first opening thereof after the pressure vessel has been charged to a determinable pressure with inflation gas, the first burst disk means is opened at least partly in response to the products of combustion produced by the pyrotechnic means.

14. The inflator defined in claim 13 wherein the first burst disk means (160) includes: a body (152) including a base portion (151) and a wall portion (152) in contact with the exterior of the pressure vessel about the first opening (114) and wherein a first burst disk (160) is sealingly mounted to the body for enclosing the first opening.

* * * * *